United States Patent
Tosato et al.

(10) Patent No.: US 10,972,170 B2
(45) Date of Patent: Apr. 6, 2021

(54) COMMUNICATION EFFICIENCY

(71) Applicant: Nokia Technologies Oy, Espoo (FI)

(72) Inventors: Filippo Tosato, Bures sur Yvette (FR); Marco Maso, Issy les Moulineaux (FR); Nhat-Quang Nhan, Reims (FR)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 16/839,614

(22) Filed: Apr. 3, 2020

(65) Prior Publication Data
US 2020/0322028 A1    Oct. 8, 2020

Related U.S. Application Data

(60) Provisional application No. 62/830,870, filed on Apr. 8, 2019.

(51) Int. Cl.
*H04B 7/06* (2006.01)
*H04B 7/10* (2017.01)
*H04B 7/0417* (2017.01)

(52) U.S. Cl.
CPC ......... *H04B 7/0634* (2013.01); *H04B 7/0417* (2013.01); *H04B 7/0639* (2013.01); *H04B 7/10* (2013.01)

(58) Field of Classification Search
CPC ...... H04B 7/0634; H04B 7/10; H04B 7/0417; H04B 7/0639; H04B 7/0469
See application file for complete search history.

(56) References Cited

U.S. PATENT DOCUMENTS 9,461,726 B2 *  10/2016  Zhou ............... H04B 7/0469
2019/0068267 A1 *  2/2019  Rahman ........... H04B 7/0482

OTHER PUBLICATIONS

Huawei, HiSilicon, "Discussion on CSI enhancement", Feb. 2019, 3GPP TSG RAN WG1 Meeting #96, pp. 1-17 (Year: 2019).*
International Search Report and Written Opinion received for corresponding Patent Cooperation Treaty Application No. PCT/FI2020/050220, dated Aug. 21, 2020, 14 pages.
"Enhanced Type II codebook for CSI feedback", 3GPP TSG RAN WG1 Meeting #96b, R1-1905063, Agenda : 7.2.8.1, Nokia, Apr. 8-12, 2019, 7 pages.
"CSI Enhancement for MU-MIMO Support", 3GPP TSG RAN WG1 Meeting #96, R1-1903343, Agenda : 7.2.8.1, ZTE, Feb. 25-Mar. 1, 2019, 15 pages.

(Continued)

*Primary Examiner* — Vineeta S Panwalkar
(74) *Attorney, Agent, or Firm* — Nokia Technologies Oy (57) ABSTRACT

There is provided a method at a user equipment, comprising: receiving transmission on two different polarizations over a wireless channel from net-work; determining a plurality of coefficients associated with a precoding matrix based on channel measurements of the reception, wherein the coefficients at least partially define a combination matrix; selecting a coefficient among the coefficients of the weaker polarization, the selected coefficient being a reference coefficient for the weaker polarization;
determining a first indicator and a second indicator for the reference coefficient, wherein the first indicator indicates a position of the reference coefficient in the combination matrix and the second indicator comprises an amplitude value associated with the reference coefficient;
reporting the first and second indicators to the network.

17 Claims, 5 Drawing Sheets

(56) References Cited

OTHER PUBLICATIONS

"On UCI Design for Type II CSI Enhancements", 3GPP TSG RAN WG1 Meeting RAN1#96-bis, R1-1905112, Agenda : 7.2.8.6, Ericsson, Apr. 8-12, 2019, pp. 1-7.
"Summary of CSI Enhancement for MU-MIMO", 3GPP TSG RAN WG1 96, R1-1902304, Agenda : 7.2.8.1, Samsung, Feb. 25-Mar. 1, 2019, 16 pages.
"UCI Design-Conclusion for Offline Email Discussion on UCI Parameters" Samsung, Mar. 2019, 2 pages.
"3rd Generation Partnership Project; Technical Specification Group Radio Access Network; NR; Multiplexing and channel coding (Release 15)", 3GPP TS 38.212, V15.5.0, Mar. 2019, pp. 1-101.
"3rd Generation Partnership Project; Technical Specification Group Radio Access Network; NR; Physical layer procedures for data (Release 15)", 3GPP TS 38.214, V15.5.0, Mar. 2019, pp. 1-103.

\* cited by examiner

BITMAP

| 0 | 1 | 0 | 0 | 0 | 0 | 0 |
|---|---|---|---|---|---|---|
| 0 | 1 | 0 | 0 | 0 | 0 | 0 |
| 0 | 0 | 0 | 1 | 0 | 0 | 0 |
| 0 | 0 | 1 | 0 | 0 | 0 | 0 |
| 1 | 1 | 0 | 0 | 0 | 0 | 0 |
| 0 | 1 | 1 | 0 | 0 | 0 | 0 |
| 0 | 0 | 0 | 0 | 0 | 0 | 1 |
| 0 | 0 | 0 | 0 | 0 | 1 | 0 |

COMMUNICATION EFFICIENCY

RELATED APPLICATION

This application claims priority from Provisional Patent Application No. 62/830,870 filed on Apr. 8, 2019, which is hereby incorporated in its entirety.

TECHNICAL FIELD

Various example embodiments relate generally to improving communication efficiency.

BACKGROUND

Precoding may take place at the transmitter using multiple antennas. Precoding may be done to adjust the signal to-be-transmitted to variations the signal may be exposed to when going through a radio channel between the transmitter and a receiver. In order to perform appropriate precoding, precoding feedback may be used.

BRIEF DESCRIPTION

According some aspects, there is provided the subject matter of the independent claims. Some further aspects are defined in the dependent claims.

LIST OF THE DRAWINGS

In the following, the invention will be described in greater detail with reference to the embodiments and the accompanying drawings, in which FIG. 1 presents a communication network to which the embodiments may be applicable to;

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as one comprising at least one of the following radio access technologies (RATs): World-wide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and enhanced LTE (eLTE). Term 'eLTE' here denotes the LTE evolution that con-nects to a 5G core. LTE is also known as evolved UMTS terrestrial radio access (EUTRA) or as evolved UMTS terrestrial radio access network (EUTRAN). A term "resource" may refer to radio resources, such as a physical resource block (PRB), a radio frame, a subframe, a time slot, a subband, a frequency region, a sub-carrier, a beam, etc. The term "transmission" and/or "reception" may refer to wirelessly transmitting and/or receiving via a wireless propagation channel on radio resources.

The embodiments are not, however, restricted to the systems/RATs given as an example but a person skilled in the art may apply the solution to other communication systems provided with necessary properties. One example of a suitable communications system is the 5G system. The 3GPP solution to 5G is referred to as New Radio (NR). 5G has been envisaged to use multiple-input-multiple-output (MIMO) multi-antenna transmission techniques, more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology/radio access network (RAT/RAN), each optimized for certain use cases and/or spectrum. 5G mobile communications may have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and being integrable with existing legacy radio access technologies, such as the LTE.

The current architecture in LTE networks is distributed in the radio and centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications). Edge cloud may be brought into RAN by utilizing network function virtualization (NVF) and software defined networking (SDN). Using edge cloud may mean access node operations to be carried out, at least partly, in a server, host or node operationally coupled to a remote radio head or base station comprising radio parts. Network slicing allows multiple virtual networks to be created on top of a common shared physical infrastructure. The virtual networks are then customised to meet the specific needs of applications, services, devices, customers or operators.

For 5G networks, it is envisaged that the architecture may be based on a so-called CU-DU (central unit-distributed unit) split, where one gNB-CU controls several gNB-DUs.

The term 'gNB' may correspond in 5G to the eNB in LTE. The gNBs (one or more) may communicate with one or more UEs 120. The gNB-CU (central node) may control a plurality of spatially separated gNB-DUs, acting at least as transmit/receive (Tx/Rx) nodes. In some embodiments, however, the gNB-DUs (also called DU) may comprise e.g. a radio link control (RLC), medium access control (MAC) layer and a physical (PHY) layer, whereas the gNB-CU (also called a CU) may comprise the layers above RLC layer, such as a packet data convergence protocol (PDCP) layer, a radio resource control (RRC) and an internet protocol (IP) layers. Other functional splits are possible too. It is considered that skilled person is familiar with the OSI model and the functionalities within each layer.

Some other technology advancements probably to be used are Software-Defined Networking (SDN), Big Data, and all-IP, to mention only a few non-limiting examples. For example, network slicing may be a form of virtual network architecture using the same principles behind software defined networking (SDN) and network functions virtualisation (NFV) in fixed networks. SDN and NFV may deliver greater network flexibility by allowing traditional network architectures to be partitioned into virtual elements that can be linked (also through software). Network slicing allows multiple virtual networks to be created on top of a common shared physical infrastructure. The virtual networks are then customised to meet the specific needs of applications, services, devices, customers or operators.

The plurality of gNBs (access points/nodes), each comprising the CU and one or more DUs, may be connected to each other via the Xn interface over which the gNBs may negotiate. The gNBs may also be connected over next generation (NG) interfaces to a 5G core network (5GC), which may be a 5G equivalent for the core network of LTE. Such 5G CU-DU split architecture may be implemented using cloud/server so that the CU having higher layers locates in the cloud and the DU is closer to or comprises actual radio and antenna unit. There are similar plans ongoing for LTE/LTE-A/eLTE as well. When both eLTE and 5G will use similar architecture in a same cloud hardware (HW), the next step may be to combine software (SW) so that one common SW controls both radio ac-cess networks/technologies (RAN/RAT). This may allow then new ways to control radio resources of both RANs. Furthermore, it may be possible to have con-figurations where the full protocol stack is controlled by the same HW and handled by the same radio unit as the CU.

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

The embodiments may be also applicable to narrow-band (NB) Internet-of-things (IoT) systems which may enable a wide range of devices and services to be connected using cellular telecommunications bands. NB-IoT is a narrowband radio technology designed for the Internet of Things (IoT) and is one of technologies standardized by the 3rd Generation Partnership Project (3GPP). Other 3GPP IoT technologies also suitable to implement the embodiments include machine type communication (MTC) and eMTC (enhanced Machine-Type Communication). NB-IoT focuses specifically on low cost, long battery life, and enabling a large number of connected devices. The NB-IoT technology is deployed "in-band" in spectrum allocated to Long Term Evolution (LTE)—using resource blocks within a normal LTE carrier, or in the unused resource blocks within a LTE carrier's guard-band—or "standalone" for deployments in dedicated spectrum.

Figure 1:
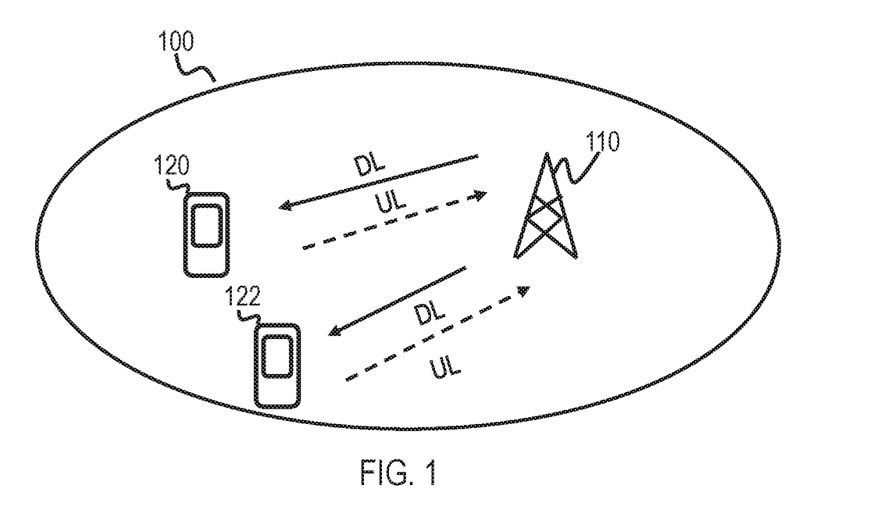

FIG. 1 illustrates an example of a communication system to which embodiments of the invention may be applied. The system may comprise a control node 110 providing a cell 100. Each cell may be, e.g., a macro cell, a micro cell, femto, or a pico cell, for example. In another point of view, the cell may define a coverage area or a service area of the access node 110. The control node 110 may be an evolved Node B (eNB) as in the LTE and LTE-A, ng-eNB as in eLTE, gNB of 5G, or any other apparatus capable of controlling radio communication and managing radio resources within a cell. The control node 110 may be called a base station, network node, or an access node.

The system may be a cellular communication system composed of a radio access network of access nodes, each controlling a respective cell or cells. The access node 110 may provide user equipment (UE) 120 (one or more UEs 120, 122) with wireless access to other networks, such as the Internet. The wireless access may comprise downlink (DL) communication from the control node 110 to the UE 120, 122 and uplink (UL) communication from the UE 120 to the control node 110. Additionally, one or more local area access nodes may be arranged within a control area of a macro cell access node. The local area access node may provide wireless access within a sub-cell that may be comprised within a macro cell. Examples of the sub-cell may include a micro, pico and/or femto cell. Typically, the sub-cell provides a hot spot within a macro cell. The operation of the local area access node may be controlled by an access node under whose control area the sub-cell is provided.

In the case of multiple access nodes in the communication network, the access nodes may be connected to each other with an interface. LTE specifications call such an interface as X2 interface. For IEEE 802.11 network (i.e. wireless local area network, WLAN, WiFi), a similar interface Xw may be provided between access points. An interface between an eLTE access point and a 5G access point may be called Xn. Other communication methods between the access nodes may also be possible.

The access node 110 may be further connected via another interface to a core network of the cellular communication system. The LTE specifications specify the core network as an evolved packet core (EPC), and the core network may comprise a mobility management entity (MME) and a gateway node. The MME may handle mobility of terminal devices in a tracking area encompassing a plurality of cells and handle signalling connections between the terminal devices and the core network. The gateway node may handle data routing in the core network and to/from the terminal devices. The 5G specifications specify the core network as a 5G core (5GC), and the core network may comprise an advanced mobility management entity (AMF) and a gateway node. The AMF may handle mobility of terminal devices in a tracking area encompassing a plurality of cells and handle signalling connections between the terminal devices and the core network. The gateway node may handle data routing in the core network and to/from the terminal devices.

The UE typically refers to a portable computing device that includes wireless mobile communication devices operating with or without a subscriber identification module (SIM), including, but not limited to, the following types of devices: a mobile station (mobile phone), smartphone, personal digital assistant (PDA), hand-set, device using a wireless modem (alarm or measurement device, etc.), laptop and/or touch screen computer, tablet, game console, notebook, vehicular device, and multimedia device.

In the case of multiple access nodes in the communication network, the access nodes may be connected to each other with an interface. LTE specifications call such an interface as X2 interface. For IEEE 802.11 network (i.e. wireless local area network, WLAN, WiFi), a similar interface Xw may be provided between access points. An interface between an eLTE access point and a 5G access point may be called Xn. Other communication methods between the access nodes may also be possible. The access node 110 may be further connected via another interface to a core network of the cellular communication system. The LTE specifications specify the core network as an evolved packet core (EPC), and the core network may comprise a mobility management entity (MME) and a gateway node. The MME may handle mobility of terminal devices in a tracking area encompassing a plurality of cells and handle signalling connections between the terminal devices and the core network. The gateway node may handle data routing in the core network and to/from the terminal devices. The 5G specifications specify the core network as a 5G core (5GC), and the core network may comprise an advanced mobility management entity (AMF) and a gateway node. The AMF may handle mobility of terminal devices in a tracking area encompassing a plurality of cells and handle signalling connections between the terminal devices and the core network. The gateway node may handle data routing in the core network and to/from the terminal devices.

In Rel-16 new radio (NR/5G), a new quantization scheme has been recently agreed to report linear combination (LC) coefficients (LCC), which form part of the precoding matrix indicator (PMI) reporting from a UE to the network, in order to support downlink multi-user multiple-input multiple-output (MU-MIMO). MU-MIMO adds multiple access (multi-user) capabilities to MIMO. In order for the transmitter (e.g. access node in downlink communication) to perform transmission with multiple antennas to multiple users while optimizing e.g. throughput, precoding may be needed.

Precoding is a generalization of beamforming to support multi-stream (or multi-layer) transmission in multi-antenna wireless communications. In conven-tional single-stream beamforming, the same signal is emitted from each of the transmit antennas with appropriate weighting (phase and gain) such that the signal power is maximized at the receiver output. When the receiver has multiple antennas, single-stream beamforming cannot simultaneously maximize the signal level at all of the receive antennas. In order to maximize the throughput in multiple receive antenna systems, multi-stream transmission is generally required. In point-to-point systems, precoding means that multiple data streams are emitted from the transmit antennas with independent and appropriate weightings such that the link throughput is maximized at the receiver output. In multi-user MIMO, the data streams are intended for different users (e.g. space-division multiple access, SDMA) and some measure of the total throughput may be maximized. In simple terms, precoding at the transmitter aims at transforming the transmit symbols' vector in such a way that the vector reaches the receiver in the strongest form that is possible in the given channel.

The transmitter may need information of the channel in order to perform proper precoding. This is what precoding matrix indicator (PMI) may be for. PMI may be part of channel state information (CSI) that the receiving device reports to the transmitting device. In practice, the channel state information is limited at the transmitter due to estimation errors and quantization. The feedback of PMI becomes more complicated with use of different polarizations by the transmitting device.

Let us first take an overview of a two-dimensional compression mechanism for PMI reporting in Rel-16 MU-MIMO, followed by a more detailed description of a quantization scheme. Although the description is written from downlink point of view such that e.g. the access node 110 is the transmitter and UEs 120, 122 are the receivers, the embodiments are applicable to uplink communications as well, or to M2M/D2D communications, in general to any transmitter-receiver communication link. Likewise, the embodiments are applicable to single user (SU) MIMO as well.

In Rel-16 MU-MIMO PMI feedback, a UE applies compression in spatial domain (SD) and in frequency domain (FD) to a matrix of coefficients representing the collection of precoding vectors for a given spatial layer for all the configured sub-bands. Let us denote W as a sub-band PMI matrix of size $2N_1N_2 \times N_3$, where $N_1$ and $N_2$ are the numbers of antenna ports associated to two polarisations used by a two-dimensional cross-polarised transmit antenna array and $N_3$ is the number of configured PMI sub-bands. The PMI matrix may be called a precoder matrix, for simplicity. For rank indicators (RI) larger than one, there is one such PMI matrix for each of the RI spatial layers. For ease of notation in the following let us consider a generic layer compression, as the quantization operation in Rel-16 MU-MIMO PMI feedback is applied independently to each of the RI layers. The compression operations on W are linear and can be represented by the following equation $$W = W_1 \tilde{W}_2 W_f^H \qquad (1)$$

where the column vectors of matrix $W_1$ are the components of the SD orthogonal basis of size 2L, the columns of $W_f$ form the FD orthogonal basis of size M, and $\tilde{W}_2$ is a 2L×M matrix of complex-valued LC coefficients representing a compressed version of the precoder matrix. This matrix $\tilde{W}_2$ may be called a combination matrix, or a combination coefficient matrix. That is, the precoder matrix may be compressed in the spatial domain, e.g. $L<2N_1N_2$, and further compressed in the frequency domain, e.g. $M<N_3$. Each of the coefficients (also called combination coefficients or LC coefficients) in $\tilde{W}_2$ may indicate how the channel affects the signal reference within a given spatial beam (component) and on a certain frequency beam (or component). The components of the SD and FD bases are selected from suitable, and optionally oversampled, discrete Fourier transform (DFT) codebooks. To further reduce the signalling overhead, only a some of the 2LM LC coefficients are reported, and the remaining ones are set to zero. This group of reported LC coefficients are referred to as nonzero (NZ) coefficients. These are the coefficients that exceed a certain predetermined amplitude threshold, for example.

The PMI report, e.g. from the UE to the access node, for a given layer may consist of two indicators for the SD and FD basis subset selection, respectively, a 2L×M bitmap indicating the location of the $K_{NZ}$ nonzero coefficients in the $\tilde{W}_2$ matrix and the quantized values of these nonzero coefficients.

Let us now consider the quantization operation of the nonzero LC coefficients. Amplitudes and phases of the coefficients are quantized separately according to the following scheme. Denote the LC coefficient associated with beam $l \in \{0,1, \ldots, 2L-1\}$ and frequency unit $m \in \{0, 1, \ldots, M-1\}$ as $c_{l,m}$, and the strongest coefficient (out of the $K_{NZ}$ non-zero coefficients reported using the bitmap) as $c_{l^*,m^*}$. UE reports, in uplink control information (UCI) the following for the quantization of the non-zero coefficients in $\tilde{W}_2$ 1. A $[\log_2 K_{NZ}]$-bit indicator for the strongest coefficient index (l*, m*) in the bitmap. This indicates the location (i.e. position) of the strongest coefficient. The strongest may be determined by the magnitudes of the coefficients.
   a. Strongest coefficient $c_{l^*,m^*}=1$ (hence its amplitude/phase are not reported)
2. Two polarization-specific reference amplitudes:
   a. For the polarization associated with the strongest coefficient $c_{l^*,m^*}=1$, since the reference amplitude=1, it is not reported
   b. For the other polarization, reference amplitude (i.e. the amplitude of the strongest coefficient associated with the corresponding polarization) is quantized to 4 bits
   The alphabet is $$\left\{1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}}, 0\right\}$$

(−1.5 dB step size)
3. For $\{c_{l,m}, (l, m) \neq (l^*, m^*)\}$:
   a. For each polarization, differential amplitudes $p_{diff}(l, m)$ of the coefficients calculated relative to the associated polarization-specific reference amplitude $p_{ref}(l, m)$ and quantized to 3 bits
   The alphabet is $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}$$

(−3 dB step size)
      Note: The final quantized amplitude $p_{l,m}$ is $p_{ref}(l,m) \times p_{diff}(l,m)$
   b. Each phase is quantized to either 8PSK (3-bit) or 16PSK (4-bit) (configurable)

There may be problems in the reporting of parameter 2b above, namely the reference amplitude of the weaker polarization(s), in the uplink control information (UCI) message. The current list of agreed UCI fields is shown below in Table 1.

TABLE 1

List of agreed UCI parameters

| Parameter | Location | Details/description |
|---|---|---|
| # NZ coefficients | UCI part 1 | |
| Wideband channel quality indicator (CQI) | UCI part 1 | Same as R15 |
| Subband CQI | UCI part 1 | Same as R15 |
| Bitmap per layer | UCI part 2 | RI = 1-2: for layer l, size-$2L_lM_l$ |
| Strongest coefficient indicator (SCI) | UCI part 2 | |
| SD basis subset selection indicator | UCI part 2 | |
| FD basis subset selection indicator | UCI part 2 | |
| LC coefficients: phase | UCI part 2 | Quantized independently across layers |
| LC coefficients: amplitude | UCI part 2 | Quantized independently across layers (including reference amplitude for weaker polarization, for each layer) |

Parameter 2b, i.e., the reference amplitude of the weaker polarisation, may be included in the last row of the above list (LC coefficient amplitudes) in UCI part 2. Note that the order in which these amplitude values are encoded to a sequence in this UCI field is determined by the bitmap according to a specified reading order, for example by increasing index of dimension, with rows (SD) first dimension and columns (FD) second. However, this reading order cannot be applied to the reference amplitude of the weaker polarization. This problem may require a definition of a new rule to identify the position of the reference amplitude in the UCI field of quantized LC coefficient amplitudes or, equivalently, introduce a separate UCI field for this parameter.

Figure 2A:
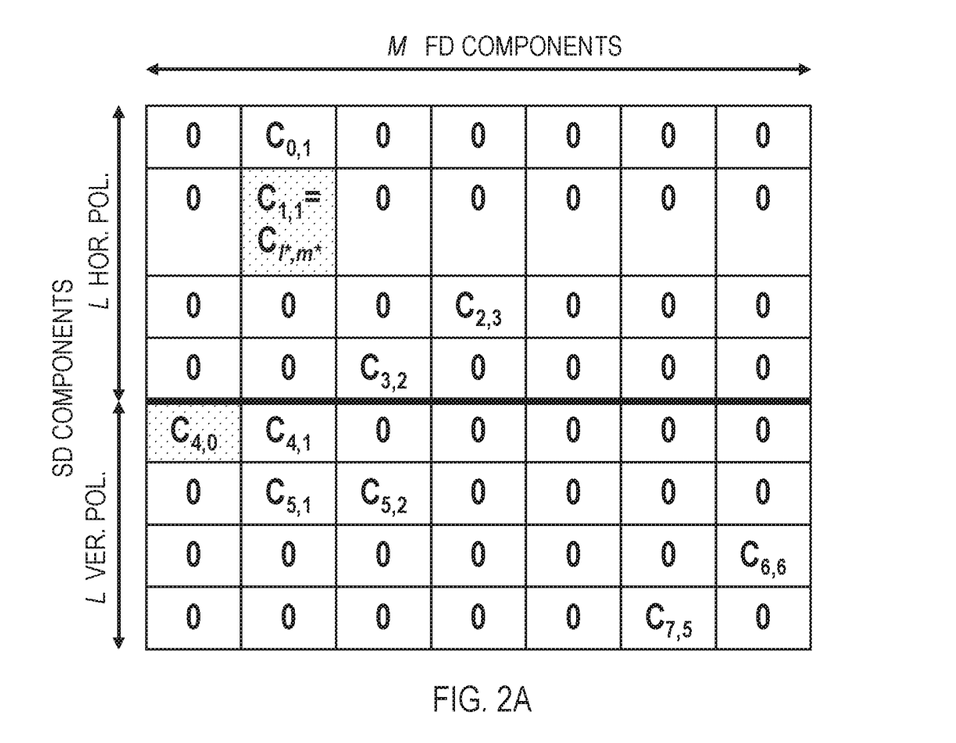
FIGS. 2A and 2B show examples matrix and a bitmap, respectively.
Figure 2B:
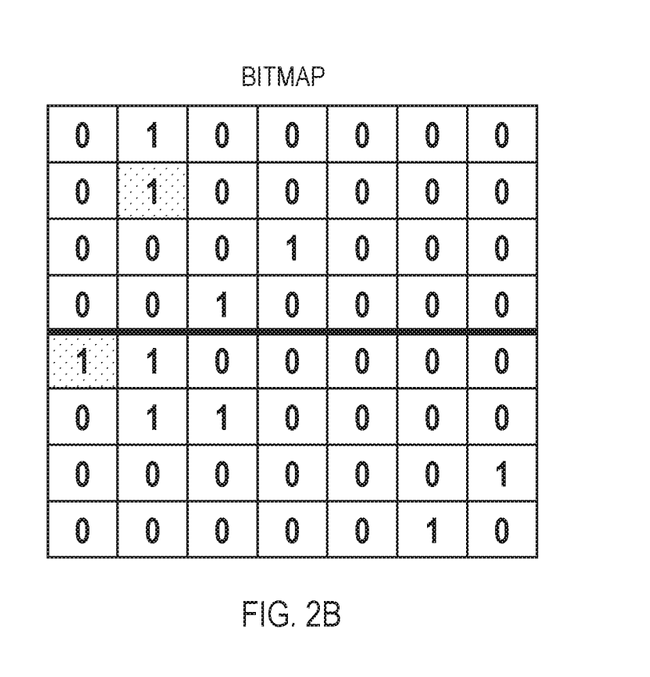

To understand the problem in more details, let us describe in more detail, by an example, how the quantization scheme works with reference to FIGS. 2A and 2B. FIG. 2A represents the $\tilde{W}_2$ matrix with $K_{NZ}=10$ nonzero LC coefficients before normalization and quantization. FIG. 2B shows a corresponding bitmap. The strongest coefficient for each polarization is highlighted by a dotted cell: $c_{1,1}$ for the horizontal polarisation and $c_{4,0}$ for the vertical polarisation. As explained above, let us denote $c_{l^*, m^*} = c_{1,1}$ as the strongest coefficient overall (i.e. over all polarizations).

As said, FIG. 2A shows an example configuration of the nonzero LC coefficients in $\tilde{W}_2$ before quantization. Let amplitude and phase of a generic coefficient be given by: $c_{l,m} = a_{l,m} e^{j\Phi_{l,m}}$. The strongest coefficient for each polarisation is highlighted in the figure and serves as an amplitude reference for amplitude quantization of its polarisation. The strongest coefficient overall is found in the horizontal polarisation in this example and it is denoted by $c_{l^*,m^*}$, whereas the strongest coefficient of the other polarization (the weaker) is $c_{4,0}$.

Before applying the scalar quantizers to amplitudes and phases, these are normalised as follows.

Phase normalisation: the phase of all coefficients is normalised by the phase of the strongest, $c_{l^*,m^*}$: $\phi_{l,m} \rightarrow \phi_{l,m} - \phi_{l^*,m^*}$.

Amplitude normalisation: the amplitude of all coefficients in a polarization is normalised by the respective amplitude reference. For the horizontal polarisation: $a_{l,m} \rightarrow a_{l,m}/a_{l^*,m^*}$. For the vertical polarization: $a_{l,m} \rightarrow a_{l,m}/a_{4,0}$ The reference amplitude for the weaker polarisation, denoted with A, is given by: $A = a_{4,0}/a_{l^*,m^*}$.

Following these, the normalized values of non-zero coefficients in cells (l,m) of FIG. 2A becomes:

cell (0, 1): $\frac{a_{0,1}}{a_{1,1}} e^{j(\phi_{0,1} - \phi_{1,1})}$, cell (1, 1): $\frac{a_{1,1}}{a_{1,1}} e^{j(\phi_{1,1} - \phi_{1,1})} = 1$, this is the reference amplitude for horizontal polarization, which is in this example assumed to be the stronger polarization, i.e. the one providing the strongest magnitude in the matrix $\tilde{W}_2$, cell (2, 3): $\frac{a_{2,3}}{a_{1,1}} e^{j(\phi_{2,3} - \phi_{1,1})}$, cell (3, 2): $\frac{a_{3,2}}{a_{1,1}} e^{j(\phi_{3,2} - \phi_{1,1})}$, cell (4, 0): $\frac{a_{4,0}}{a_{1,1}} e^{j(\phi_{4,0} - \phi_{1,1})}$, here $$A = \frac{a_{4,0}}{a_{1,1}}$$

represents the reference amplitude for vertical polarisation, which is in this example assumed to be the weaker polarization, cell (4, 1) $\frac{a_{4,1}}{a_{4,0}} e^{j(\phi_{4,1} - \phi_{1,1})}$, cell (5, 1): $\frac{a_{5,1}}{a_{4,0}} e^{j(\phi_{5,1} - \phi_{1,1})}$, cell (5, 2): $\frac{a_{5,2}}{a_{4,0}} e^{j(\phi_{5,2} - \phi_{1,1})}$, cell (6, 6): $\frac{a_{6,6}}{a_{4,0}} e^{j(\phi_{6,6} - \phi_{1,1})}$, and cell (7, 5): $\frac{a_{7,5}}{a_{4,0}} e^{j(\phi_{7,5} - \phi_{1,1})}$.

Further, scalar quantization may be applied separately to the amplitudes and phases of the nonzero coefficients. Because the location of the strongest coefficient overall is indicated by a special UCI field 'strongest coefficient indicator (SCI)' in Table 1, and its value is 1, its amplitude and phase are not quantized nor reported. Hence there are in total $K_{NZ}-1$ amplitudes and $K_{NZ}-1$ phases to be quantized and reported in the two fields of UCI part 2 (last two rows in Table 1). These quantized values are reported in a bit sequence to the network, for example.

The order in which the binary representations of the quantized LC coefficient amplitudes and phases are arranged in their respective UCI field can be determined from the bitmap, for example by reading the position of 1s "row-wise" or "column-wise". Other orders are possible, for example, by reporting the nonzero coefficients of the horizontal polarisation first, followed by those of the vertical polarization, etc.

The problem is that the receiver of the UCI (or of other control signaling) may need to know which of the $K_{NZ}-1$ reported quantized amplitudes is the quantized normalized reference amplitude $A_q$ for the weaker polarisation (in this example, the vertical polarization). This is because the network node (or other receiver of the report) may need to reconstruct the amplitudes in the weaker polarisation by multiplying the reported quantised amplitudes of the weaker polarization with the quantized reference amplitude $A_q$. It needs to be noted that the network node can determine which is the weaker polarisation from the SCI parameter and the bitmap. The network node can also determine from the bitmap which quantized amplitudes belong to the weaker polarisation. However, there is no provision for an indicator of position for the strongest coefficient for the weaker polarisation in the bitmap and no way for the network node to infer this information from other UCI parameters. Moreover, the normalized reference amplitude $A_q$ is quantized with 4 bits, 1 bit more than all the other amplitudes, which makes it impossible for the network node to parse the binary sequence of the LC coefficient amplitudes in the UCI field without knowing the location of the normalized reference amplitude $A_q$.

To at least partially tackle this problem, one potential solution may be to add an indicator for the position of the strongest coefficient of the weaker polarisation in the UCI. This indicator may require $\lceil \log_2 K_{NZ} \rceil$ bits if $K_{NZ}$ is known for each layer, or $\lceil \log_2 K_0 \rceil$, where $K_0$ is a parameter configured by the network through higher layer signalling, which sets a maximum number of nonzero coefficients for any layer. However, this may require quite extensive signaling overhead.

Therefore, it may be more beneficial to tackle this problem with another solution such that the provision of an indication of the location/position of the strongest coefficient for the weaker polarization in the bitmap with less signaling overhead. As will be shown, this solution may further avoid the need to indicate the position of this coefficient explicitly.

Figure 3:
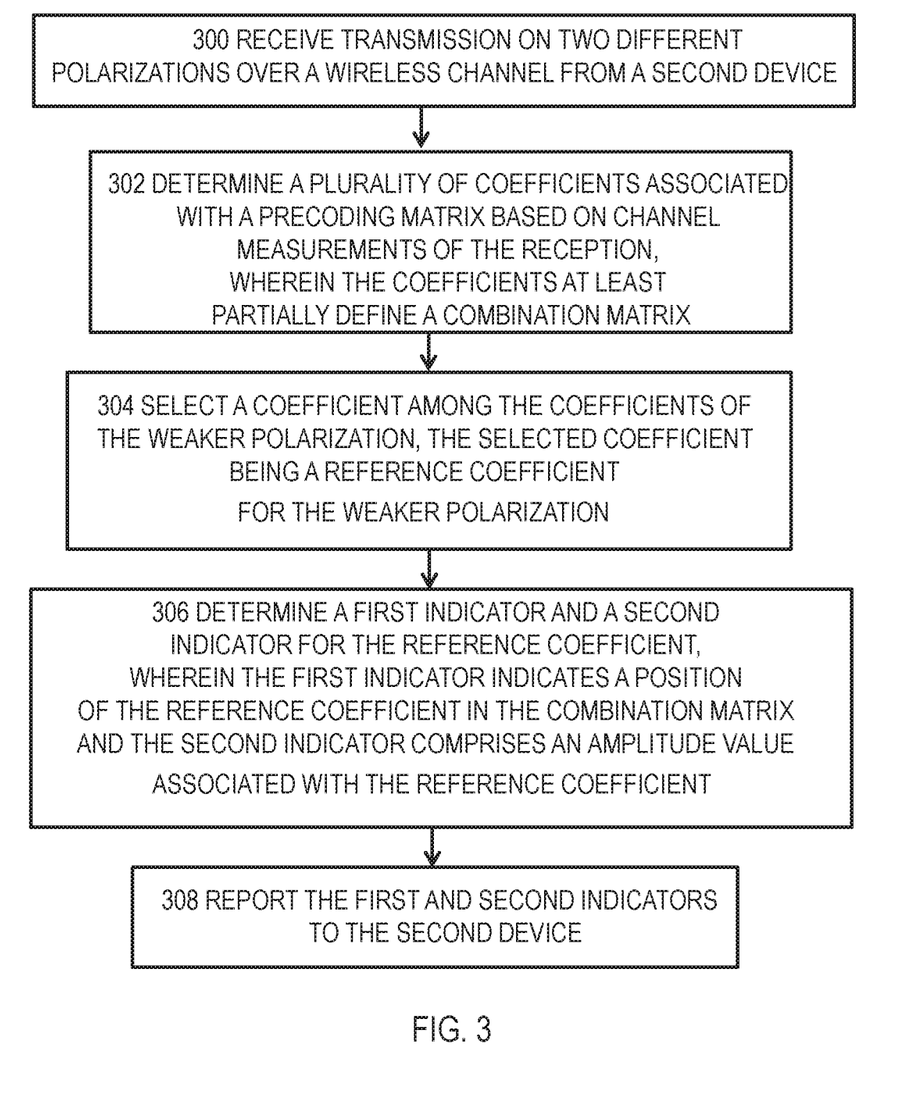
FIGS. 3 and 4 show methods, according to some embodiments.

This solution is depicted in FIG. 3 from the point of view of a first device, e.g. the receiving device, such as the UE 120 or 122.

The UE may in step 300 receive transmission/communications on two different polarizations over a wireless channel from a second device, e.g. the network such as from the access node 110. The transmission may include data or control signalling. The transmission may include reference signals. The reference signals may be e.g. cell-specific reference signals. In one embodiment, the network may send channel state information reference signals (CSI-RS) to allow CSI/PMI estimation and calculation at the UE. The polarizations may include e.g. horizontal and vertical polarizations.

In step 302, the UE may determine a plurality of coefficients associated with a precoding matrix (such as W) based on channel measurements of the reception of step 300, wherein the coefficients at least partially define the combination matrix $W_2$. As explained above, the UE may determine amplitude (also known as magnitude) and phase of coefficients of the PMI corresponding to certain spatial and frequency domain beams. The determined PMI coefficients may form a matrix which depicts how the precoding vector associated to the measured channel changes in spatial and frequency domain.

In step 304, the UE may select a coefficient among the coefficients of the weaker polarisation, the selected coefficient being a reference coefficient for the weaker polarization. For simplicity, let us consider that there are two polarizations, say horizontal and vertical polarizations as in FIG. 2A. The reference coefficient may be a reference coefficient for the selected polarization, i.e. for the weaker of the two polarizations.

In an embodiment, the reference coefficient is the coefficient with the largest magnitude within the coefficients of or associated with the weaker polarization. In an embodiment the strongest polarization is the polarization from which the coefficient with the largest magnitude is measured. In another embodiment, the strongest polarization may be determined based on average amplitude of all coefficients. Therefore, in an embodiment, the UE may determine the strongest polarization out of the two polarizations. Likewise, the UE may determine which is the weakest polarization out of the two polarizations. In the example referred to above with respect to FIG. 2A, the strongest polarization may be the horizontal polarization, as the strongest coefficient $c_{1,1}$ is associated with that polarization, and the weaker polarization is the vertical polarization. The reference coefficient is $c_{4,0}$ because that is the strongest coefficient of the weaker polarization. As said, by "strongest coefficient" it is meant the coefficient with the largest magnitude.

In case there are two coefficients that are equal in magnitudes, one associated with each of two polarization, then there may be a predetermined rule defining which of the two polarizations is considered as the weaker polarization from which the reference coefficient (e.g. the other of the two equally strong coefficients) is selected. In case polarization A is associated with two equally strong coefficients x and y which are the strongest coefficients in that polarization A but another polarization B is associated with one or more stronger coefficients, then polarization B is the strongest polarization and polarization B is the weaker polarization. Furthermore, there may be predefined rules for selecting either of coefficients x or y as the reference coefficient for the coefficients of polarization B.

In step 306 the UE may determine a first indicator and a second indicator for the reference coefficient. In an embodiment, the first indicator indicates a position of the reference coefficient in the combination matrix. In an embodiment, the position of the first indicator in a sequence indicates the position of the reference coefficient $c_{4,0}$ in the combination matrix. In an embodiment, the second indicator comprises an amplitude value associated with the reference coefficient.

In step 308 the UE may report the first and second indicators to the access node 110. These may be reported in uplink control signaling, e.g. in physical uplink control channel (PUCCH) or in physical uplink shared channel (PUSCH), for example. The report may be part of PMI reporting, or CSI reporting. In an embodiment, the first indicator is included in the sequence which is transmitted to the network.

Figure 4:
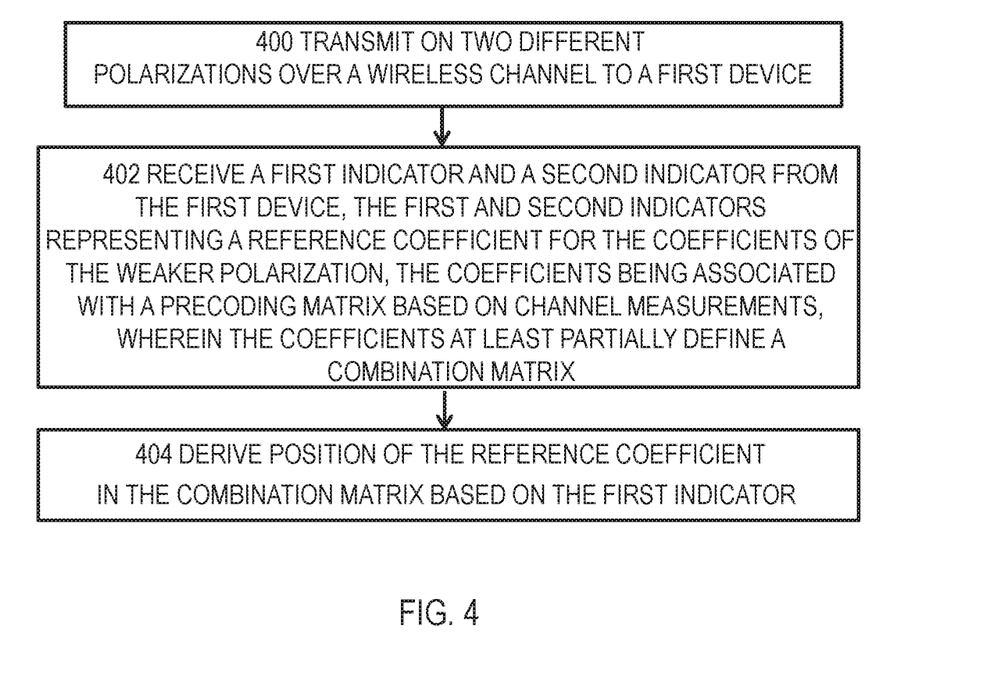

FIG. 4 shows the proposed solution from the point of view of the second device, such as a network node (e.g. the access node 110).

In step 400, the access node may transmit on two different polarizations over a wireless channel to the first device, e.g. the UE 120, 122. As said in connection of step 300, the transmission may comprise data and/or control signaling. The transmission may comprise e.g. reference signals useable by the receiving device to determine how the channel affects the transmitted signals.

In step 402, the access node may receive the first indicator and the second indicator from the UE, the first and a second indicators representing the reference coefficient for combination coefficients of the weaker polarization, the combination coefficients being associated with the precoding matrix based on channel measurements (performed by the UE), wherein the combination coefficients at least partially define the combination matrix. As explained, in some embodiments, the reference coefficient is $c_{4,0}$, because that is the strongest coefficient of the weaker (vertical) polarization.

In step 404, the access node 110 may derive the position of the reference coefficient in the combination matrix based on the first indicator, as will be described.

In an embodiment, the UE may report to the network also the bitmap of FIG. 2B. The bitmap may correspond to the combination matrix. E.g. The '1's in the bitmap may represent non-zero coefficients of the matrix, while '0's may correspond to the coefficient of $\tilde{W}_2$ that are below the predetermined threshold. In this way the bitmap may indicate spatial and frequency domain locations of those coefficients that exceed the predetermined threshold (i.e. non-zero coefficients). The threshold may be an amplitude threshold. In an embodiment, the UE may report the first indicator in the sequence, the sequence comprising amplitude values of the coefficients exceeding the predetermined threshold except the coefficient with the largest magnitude. As said earlier, there are in total $K_{NZ}-1$ amplitudes and $K_{NZ}-1$ phases to be quantized and reported in the two fields of UCI part 2 (last two rows in Table 1). These quantized values may correspond to the amplitude values of the coefficients exceeding the predetermined threshold except the coefficient with the largest magnitude. However, according to this embodiment, the value corresponding to the coefficient $c_{4,0}$ is not reported in the sequence as $$\frac{a_{4,0}}{a_{1,1}}$$

quantized with four bits. In this embodiment, the first indicator represents/indicates/comprises a predetermined value in the sequence, such as a bit sequence '111' or '1111', i.e. the maximum quantized value. Other predetermined values, known by the UE and the network, are possible as well. A predetermined value representing '1' may be obtained by dividing the amplitude $a_{4,0}$ with itself.

It needs to be noted that the order of the sequence is determined by the bitmap, for example by reading the position of 1s "row-wise" or "column-wise". This rule may be known by both parties of the communication. Therefore, one implementation of the solution described above comprises in defining the LCC amplitudes in a sequence in the UCI field with $K_{NZ}-1$ 3-bit binary strings, each representing the quantized value of a nonzero coefficient in the bitmap, except for the strongest coefficient $c_{1,1}$ overall. The number of binary strings and the order of coefficients in the sequence is the same as that of the LCC phase field. However, the differential amplitude corresponding to the strongest coefficient of the weaker polarisation is given by the 3-bit binary string representing '1'.

In the example of FIG. 2A and by adopting a row-wise order of nonzero elements from the bitmap of FIG. 2B, the LCC amplitude sequence of the UCI contains the quantized representation of the following normalised differential amplitude values:

| 1 | $\frac{a_{0,1}}{a_{1,1}}$ | $\frac{a_{4,1}}{a_{4,0}}$ | $\frac{a_{5,1}}{a_{4,0}}$ | $\frac{a_{3,2}}{a_{1,1}}$ | $\frac{a_{5,2}}{a_{4,0}}$ | $\frac{a_{2,3}}{a_{1,1}}$ | $\frac{a_{7,5}}{a_{4,0}}$ | $\frac{a_{6,6}}{a_{4,0}}$ | wherein the '1' is in the first cell of the sequence because $c_{4,0}$ is the first coefficient when going through non-zero coefficients of the FIG. 2A or 2B row-wise. Had coefficient $C_{5,1}$ been the coefficient with the largest magnitude within the weaker polarization, then the location of first indicator ('1') in the sequence would be the fourth cell (currently reading $$\frac{a_{5,1}}{a_{4,0}}\Big),$$

the first cell of the sequence would be $$\frac{a_{4,0}}{a_{5,1}},$$

and all the denominators in the sequence currently reading $a_{4,0}$ would be replaced with $a_{5,1}$.

In prior art solutions the first cell in the sequence would comprise a 4-bit quantized value of $$\frac{a_{4,0}}{a_{1,1}}.$$

However, it would be impossible for the receiver of the sequence to derive which of the bit strings in the sequence corresponds to the reference coefficient $c_{4,0}$ of the weaker polarization. With the current proposal this is possible because the receiver knows that the UE will mark quantized value of '1' (or of some other predetermined value) in the position of the reference coefficient $c_{4,0}$ of the weaker polarization.

This predetermined value '1' may be called an amplitude value because it may be obtained with equation $$\frac{a_{4,0}}{a_{4,0}}.$$

In other words, mathematically such value is obtained as the differential amplitude of the reference coefficient of the weaker polarization which implicitly provides the location of such coefficient in the bit map and consequently in the matrix. This holds regardless of the number of elements in the weaker polarization which have the same amplitude of the reference element. In fact:

If the reference element of the weaker polarization is strictly the largest, then only one '1' appears in the overall sequence, i.e., the 3-bit sequence '111'.

If the reference element of the weaker polarization has the same amplitude (the largest anyway) as one or more other elements in the weaker polarization, then there could be as many '1' values in the differential amplitude sequence as the number of elements with the same amplitude. For instance, say there are 4 coefficients in the weaker polarization, let us call them c1, c2, c3, c4 for simplicity. Assume that c1, c3 and c4 have amplitude 3, whereas c2 has amplitude 2. Now, let us label c1 as the reference value. Its amplitude is the largest, even if identical to other 2 coefficients. In such case there may be a predetermined rule to choose a certain one of the 3 coefficients as the reference coefficient. Then the UE may calculate c1/c1=1, c2/c1=0.66, c3/c1=1 and c4/c1=1. The resulting differential amplitude bit sequence may be '111NNN111111', where NNN represents the bit sequence associated to quantized 0.66 and the sequence(s) 111 indicate the location of the element(s) with largest amplitude in the weaker polarization.

In both cases, the '1' can still be used as an indicator of the location of the reference coefficient of the weaker polarization, since it would always be the indicator of the location(s) of the strongest element(s) in the weaker polarization.

The network node receiving the bitmap and the first indicator in the sequence may derive the position of the reference coefficient $c_{4,0}$ in the combination matrix based on the first indicator (e.g. location of it in the sequence) and the bitmap.

For completeness it is noted that, in an embodiment, the UE reports another sequence for phases in the UCI. E.g. the LCC phase field of the UCI contains the corresponding quantized representation of the following normalised values:

| $\phi_{4,0}$ | $\phi_{0,1}$ | $\phi_{4,1}$ | $\phi_{5,1}$ | $\phi_{3,2}$ | $\phi_{5,2}$ | $\phi_{2,3}$ | $\phi_{7,5}$ | $\phi_{6,6}$ |
|---|---|---|---|---|---|---|---|---|
| $-\phi_{1,1}$ | $-\phi_{1,1}$ | $-\phi_{1,1}$ | $-\phi_{1,1}$ | $-\phi_{1,1}$ | $-\phi_{1,1}$ | $-\phi_{1,1}$ | $-\phi_{1,1}$ | $-\phi_{1,1}$ |

I.e. there may not need be any changes to the reporting of the phase.

In an embodiment, the UE may report the second indicator in a field, the position of which is independent of the first indicator. In an embodiment, the second indicator is reported in a field in the UCI. The field may be a new field with respect to the ones listed in Table 1. In another embodiment, the second indicator is reported in a predetermined position in the sequence. In other words, there may be a specific, predetermined, rule that identifies the position of the second indicator in the sequence of quantized amplitudes. For example, it may be appended at the beginning or at the end of the sequence. In that way, the location of the second indicator is not determined by the position of the coefficient $c_{4,0}$ in the bitmap, but by a different rule.

In an embodiment, the second indicator represents the amplitude of the reference coefficient $c_{4,0}$ with respect to the amplitude $a_{1,1}$ of the coefficient with the largest magnitude c1,1, thereby enabling the second device to derive the amplitude $a_{4,0}$ of the reference coefficient $c_{4,0}$ In one embodiment, a 4-bit field is introduced, possibly to UCI part 2, where in the 4 bit field comprises the quantized representation of a reference amplitude. In the example used, this reference amplitude for the reference coefficient may be reported as the second indicator by the quantized bit string of the value $$\frac{a_{4,0}}{a_{1,1}}.$$

In an embodiment, where $a_{4,0}=a_{1,1}$, the value of the quantized value of the second indicator may be '1111' (assuming quantization with four bits, the number of bits may vary according to specifications, for example). Such '1111' event for the weaker polarization is not very likely, since this would imply that the amplitude of the strongest element of the weaker polarization is identical to the amplitude of the strongest element of the stronger polarization. In general, it is expected that the four bits sequence associated to the amplitude of the reference value of the weaker polarization not to be a '1111' but another 'NNNN' sequence representing a value where $$\frac{a_{4,0}}{a_{1,1}}$$

is less than 1.

After the network node receives the second indicator, the network node may derive the magnitude $a_{4,0}$ of the reference coefficient $c_{4,0}$ based on the second indicator. For example, say amplitudes $a_{1,1}$ is 5 and $a_{4,0}$ is 3. Then the value that is provided as the second indicator (before quantization) is $a_{4,0}/a_{1,1}=3/5=0,6$. I.e. this is what is quantized with certain amount of bits, e.g. 4 bits, and sent to the network. The other weaker polarization's coefficients' amplitudes are normalized to $a_{4,0}$. E.g. amplitude for coefficient c4,1 is normalized as $a_{4,1}/a_{4,0}$ in the sequence. Say $a_{4,1}=2$, then the value provided in the sequence represents 2/3=0,66 (in quantized values). The network node receiving these may further derive the ratio between $a_{1,1}$ and $a_{4,1}$, as 0,6*0,66=0,4. The network node may thus be able to perform reconstruction of the original matrix up to a scaling and a phase rotation (assuming enough quantization bits is used to neglect the quantization error). for example, in this case the network node 110 could reconstruct: $a_{1,1}=1$, $a_{4,0}=0.6$, $a_{4,1}=0.4$. These values may correspond to the original values of $a_{1,1}$, $a_{4,0}$ and $a_{4,1}$ scaled by 5 (which is the original value of $a_{1,1}$ in this imaginary example).

Figure 5:
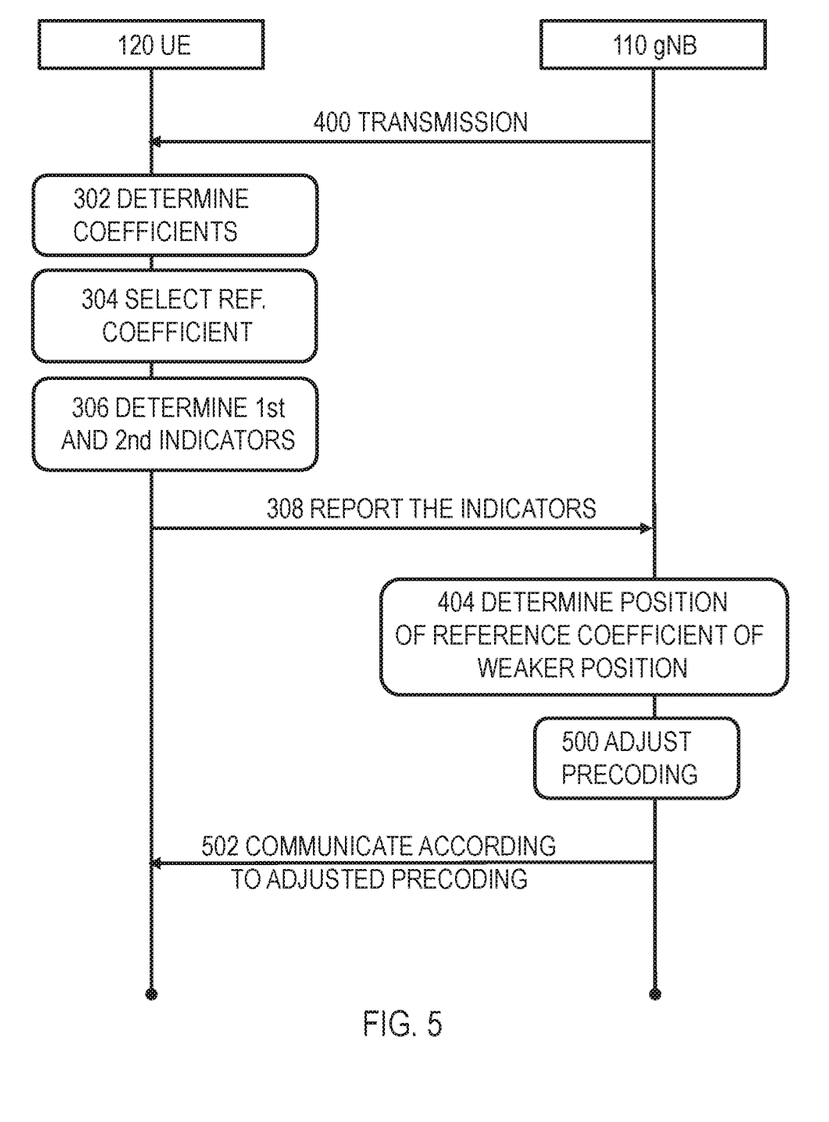
FIG. 5 illustrates a signaling flow diagram, according to an embodiment.

Let us take a look at the proposed solution in a signaling flow diagram between devices UE 120 and gNB 110, as shown in FIG. 5. Steps 400, 302-308 and 404 have been explained already in connection of FIGS. 3 and 4. In step 500, the network node 110 may, after having received the UCI comprising the PMI report (including the indicators), derive the position of also the reference coefficient of the weaker polarization in addition to the reference coefficient of the stronger polarization, and then adjust precoding for the UE 120 in an appropriate manner Thereafter, the network node 110 and the UE 120 may communicate according to the adjusted precoding in an efficient manner. For example, according to some specifications, the gNB may use the PMI communicated by the UE for a given frequency resource to serve the UE over that frequency resource. Further, nothing prevents the gNB to perform suitable signal processing over the received PMIs from different UEs to ensure that some relationships among them are respected. With "relationships" it is meant that when more than one UE is served over the same frequency resource (at the same time) then the gNB may want to ensure that the layers sent to the more than one UEs are in a relationship of mutual orthogonality (e.g., zero-forcing). If this is the case, then the PMIs sent by the more than one UEs for that frequency resource may be processed in order to be mutually orthogonal.

The solution may provide an efficient way of including the reference amplitude of the weaker polarization e.g. in the UCI message. This may be important as its location cannot be determined by the bitmap like for the other coefficients and indicating this location explicitly is costly in overhead. The solution may be applied separately for each RI layer.

The proposed embodiments may require fewer bits than the solution comprising the explicit indication, where $\lfloor \log_2 K_{NZ} \rfloor$ (or $\lfloor \log_2 K_0 \rfloor$) bits are needed for the position indicator in the UCI. In fact, $K_{NZ}$ and $K_0$ are typically larger than $2^3=8$. With more than three bits required for the location indicator in UCI and additional 4 bits needed for the quantized representation of the amplitude of the coefficient c4,0, altogether at least 8 bits are needed to convey the required information to the network device. In the proposed solution, less bits are needed because the predetermined value, such as '1', in the sequence may be indicated with three bits and a separate parameter (e.g. in the UCI), representing the quantized normalized reference amplitude $A_q$, may be indicated with 4 bits. This requires altogether 7 bits, which is less than at least 8 bits.

Looking from another point of view, it can be said that the UE receives transmission on two different polarizations over a wireless channel from a second device; measures a plurality of coefficients based on the reception; determines a reference coefficient among a subset of the coefficients for the subset of the coefficients; determines a first indicator and a second indicator for an amplitude of the reference coefficient; and reports the first and second indicators to the second device. The network node, as an example of the second device, may then receive the first indicator and a second indicator from the first device, the first and a second indicators representing an amplitude for the reference coefficient of a subset of coefficients. As described earlier, both the first and second indicators may be called amplitude indicators. The term "for an amplitude" may refer here to an indicator that in some way represents the amplitude/magnitude of the reference coefficient. Examples may include differential amplitude representing the difference or ratio of the amplitude of the reference coefficient (e.g. $c_{4,0}$) with respect to another amplitude, e.g. with respect to the amplitude of the reference coefficient ($c_{4,0}$) itself or with respect to amplitude/magnitude of another coefficient, such as $c_{1,1}$ or some other coefficient. In an embodiment, the reference coefficient is the coefficient with the largest magnitude within the subset of coefficients. In an embodiment, the subset comprises the coefficients of a certain polarisation. In an embodiment, the certain polarization is the weaker polarization.

Figure 6:
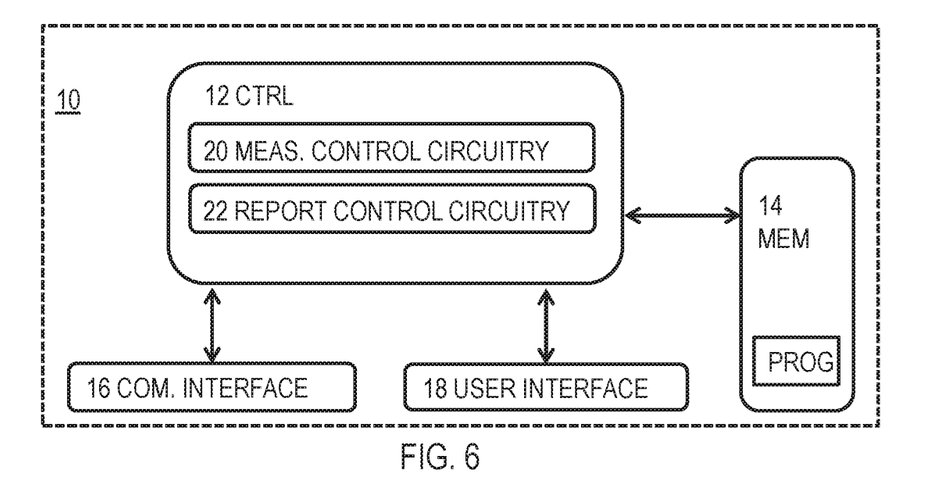
FIGS. 6 and 7 illustrate apparatuses, according to some embodiments.

An embodiment, as shown in FIG. 6, provides an apparatus 10 comprising a control circuitry (CTRL) 12, such as at least one processor, and at least one memory 14 including a computer program code (PROG), wherein the at least one memory and the computer program code (PROG), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory.

In an embodiment, the apparatus 10 may comprise the terminal device of a communication system, e.g. a user terminal (UT), a computer (PC), a laptop, a tabloid computer, a cellular phone, a mobile phone, a communicator, a smart phone, a palm computer, a mobile transportation apparatus (such as a car), a household appliance, or any other communication apparatus, commonly called as UE in the description. Alternatively, the apparatus is comprised in such a terminal device. Further, the apparatus may be or comprise a module (to be attached to the UE) providing connectivity, such as a plug-in unit, an "USB dongle", or any other kind of unit. The unit may be installed either inside the UE or attached to the UE with a connector or even wirelessly.

In an embodiment, the apparatus 10 is or is comprised in the UE 120. The apparatus may be caused to execute the functionalities of some of the above described processes, such as the steps of FIG. 3.

The apparatus may further comprise communication interface (TRX) 16 comprising hardware and/or software for realizing communication connectivity according to one or more communication protocols. The TRX may provide the apparatus with communication capabilities to access the radio access network, for example. The apparatus may also comprise a user interface 18 comprising, for example, at least one keypad, a microphone, a touch display, a display, a speaker, etc. The user interface may be used to control the apparatus by the user.

The control circuitry 12 may comprise a measurement control circuitry 20 for performing measurements of the received transmission and for determining coefficient based on the measurements, according to any of the embodiments. The control circuitry 12 may further comprise a report control circuitry 22 for handling the measurement results, deriving the first and second indicators and controlling sending the report to network, according to any of the embodiments. the handling and deriving may comprise operations such as normalization and quantization, for example.

Figure 7:
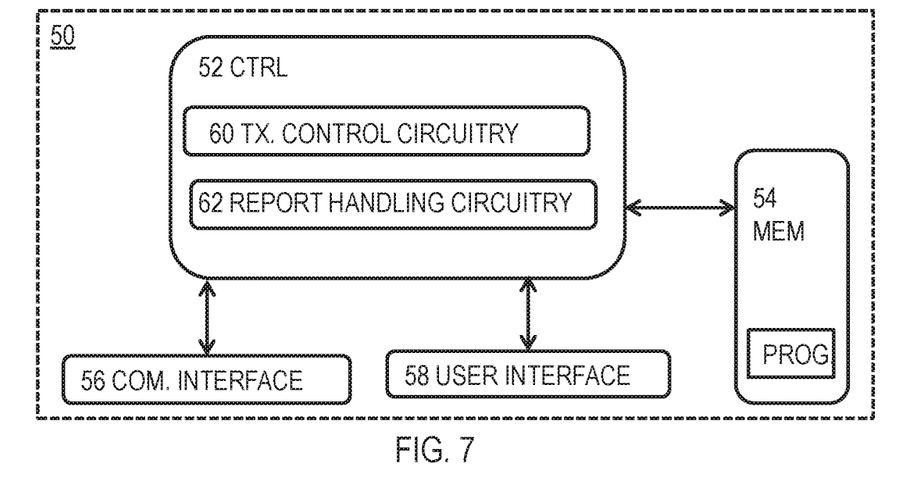

An embodiment, as shown in FIG. 7, provides an apparatus 50 comprising a control circuitry (CTRL) 52, such as at least one processor, and at least one memory 54 including a computer program code (PROG), wherein the at least one memory and the computer program code (PROG), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory.

In an embodiment, the apparatus 50 may be or be comprised in a network node, such as in gNB/gNB-CU/gNB-DU of 5G. In an embodiment, the apparatus 50 is or is comprised in the network node 110. The apparatus may be caused to execute the functionalities of some of the above described processes, such as the steps of FIG. 4.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core net-work operations and base station operations may vary depending on implementation.

In an embodiment, the server may generate a virtual network through which the server communicates with the radio node. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the apparatus 50 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the radio node may be stand-alone apparatuses communicating with each other via a radio path or via a wired connection. Alternatively, they may be in a same entity communicating via a wired connection, etc. The edge cloud or edge cloud server may serve a plurality of radio nodes or a radio access networks. In an embodiment, at least some of the described processes may be performed by the central unit. In another embodiment, the apparatus 50 may be instead comprised in the distributed unit, and at least some of the described processes may be performed by the distributed unit.

In an embodiment, the execution of at least some of the functionalities of the apparatus 50 may be shared between two physically separate devices (DU and CU) forming one operational entity. Therefore, the apparatus may be seen to depict the operational entity comprising one or more physically separate de-vices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the apparatus 50 controls the execution of the processes, regardless of the location of the apparatus and regardless of where the processes/functions are carried out.

The apparatus may further comprise communication interface (TRX) 56 comprising hardware and/or software for realizing communication connectivity according to one or more communication protocols. The TRX may provide the apparatus with communication capabilities to access the radio access net-work, for example. The apparatus may also comprise a user interface 58 comprising, for example, at least one keypad, a microphone, a touch display, a display, a speaker, etc. The user interface may be used to control the apparatus by the user.

The control circuitry 52 may comprise a transmission control circuitry 60 for controlling transmissions to and from the one or more UE 120, 122. This may include setting appropriate precoding vectors for obtaining or aiming at optimizing MIMO performance, according to any of the embodiments. The control circuitry 12 may comprise a report handling circuitry 62 e.g. for handling the received report comprising the first and second indicator from the UE, according to any of the embodiments. E.g. the reception of the first and second indicators from the UE may aid in setting up appropriate precoding for the UE.

In an embodiment, an apparatus carrying out at least some of the embodiments described comprises at least one processor and at least one memory including a computer program code, wherein the at least one memory and the computer program code are configured, with the at least one processor, to cause the apparatus to carry out the functionalities according to any one of the embodiments described.

According to an aspect, when the at least one processor executes the computer program code, the computer program code causes the apparatus to carry out the functionalities according to any one of the embodiments described. According to another embodiment, the apparatus carrying out at least some of the embodiments comprises the at least one processor and at least one memory including a computer program code, wherein the at least one processor and the computer program code perform at least some of the functionalities according to any one of the embodiments described. Accordingly, the at least one processor, the memory, and the computer program code form processing means for carrying out at least some of the embodiments described. According to yet another embodiment, the apparatus carrying out at least some of the embodiments comprises a circuitry including at least one processor and at least one memory including computer program code. When activated, the circuitry causes the apparatus to perform the at least some of the functionalities according to any one of the embodiments described.

As used in this application, the term 'circuitry' refers to all of the following:

(a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Following is a list of some aspects of the invention.

According to a first aspect, there is provided an apparatus, comprising: at least one processor and at least one memory including a computer program code, wherein the at least one memory and the computer program code are configured, with the at least one processor, to cause a first device to: receive transmission on two different polarizations over a wireless channel from a second device; determine a plurality of coefficients associated with a precoding matrix based on channel measurements of the reception, wherein the coefficients at least partially define a combination matrix; select a coefficient among the coefficients of the weaker polarization, the selected coefficient being a reference coefficient for the weaker polarization; determine a first indicator and a second indicator for the reference coefficient, wherein the first indicator indicates a position of the reference coefficient in the combination matrix and the second indicator comprises an amplitude value associated with the reference coefficient; report the first and second indicators to the second device.

Various embodiments of the first aspect may comprise at least one feature from the following bulleted list:

report a bitmap corresponding to the combination matrix to the second device, the bitmap indicating spatial and frequency domain locations of those coefficients that exceed a predetermined threshold; report the first indicator to the second device in a sequence comprising amplitude values of the coefficients exceeding the predetermined threshold except the coefficient with the largest magnitude, wherein the order of the sequence is determined by the bitmap, the position of the first indicator in the sequence determines the position of the reference coefficient in the combination matrix, and wherein the first indicator represents a predetermined value in the sequence.

report the second indicator in a field, the position of which is independent of the first indicator, wherein the second indicator represents the amplitude of the reference coefficient with respect to the amplitude of the coefficient with the largest magnitude.

wherein the second indicator is reported in a field in uplink control information.

wherein the second indicator is reported in a predetermined position in the sequence.

wherein the reference coefficient is the coefficient with the largest magnitude within coefficients of the weaker polarization.

According to a second aspect, there is provided an apparatus, comprising: at least one processor and at least one memory including a computer program code, wherein the at least one memory and the computer program code are configured, with the at least one processor, to cause a second device to: transmit on two different polarizations over a wireless channel to a first device; receive a first indicator and a second indicator from the first device, the first and second indicators representing a reference coefficient for the coefficients of the weaker polarization, the coefficients being associated with a pre-coding matrix based on channel measurements, wherein the coefficients at least partially define a combination matrix; derive position of the reference coefficient in the combination matrix based on the first indicator.

Various embodiments of the second aspect may comprise at least one feature from the following bulleted list:

receive a bitmap corresponding to the combination matrix from the first device, the bitmap indicating spatial and frequency domain locations of those coefficients that exceed a predetermined threshold; receive the first indicator from the first device in a sequence comprising amplitude values of the coefficients exceeding the predetermined threshold except the coefficient with the largest magnitude, wherein the order of the sequence is determined by the bitmap, and wherein the first indicator comprises a predetermined value in the sequence; and derive the position of the reference coefficient in the combination matrix further based on the bitmap.

receive the second indicator in a field, the position of which is independent of the first indicator, wherein the second indicator represents the amplitude of the reference coefficient with respect to the amplitude of the coefficient with the largest magnitude; derive the magnitude of the reference coefficient based on the second indicator.

wherein the reference coefficient is the coefficient with the largest magnitude within the coefficients of the weaker polarization.

According to a third aspect, there is provided a method at a user equipment, comprising: receiving transmission on two different polarizations over a wireless channel from network; determining a plurality of coefficients associated with a precoding matrix based on channel measurements of the reception, wherein the coefficients at least partially define a combination matrix; selecting a coefficient among the coefficients of the weaker polarization, the selected coefficient being a reference coefficient for the weaker polarization; determining a first indicator and a second indicator for the reference coefficient, wherein the first indicator indicates a position of the reference coefficient in the combination matrix and the second indicator comprises an amplitude value associated with the reference coefficient; reporting the first and second indicators to the network. Various embodiments of the third aspect may comprise at least one feature from the bulleted list under the first aspect.

According to a fourth aspect, there is provided a method at a network node, comprising: transmitting on two different polarizations over a wireless channel to a user equipment; receiving a first indicator and a second indicator from the user equipment, the first and second indicators representing a reference coefficient for the coefficients of the weaker polarization, the coefficients being associated with a pre-coding matrix based on channel measurements, wherein the coefficients at least partially define a combination matrix; deriving position of the reference coefficient in the combination matrix based on the first indicator. Various embodiments of the fourth aspect may comprise at least one feature from the bulleted list under the second aspect.

According to a fifth aspect, there is provided a computer program product embodied on a distribution medium readable by a computer and comprising program instructions which, when loaded into an apparatus, execute the method according to the third aspect. Various embodiments of the fifth aspect may comprise at least one feature from the bulleted list under the first aspect.

According to a sixth aspect, there is provided a computer program product embodied on a distribution medium readable by a computer and comprising program instructions which, when loaded into an apparatus, execute the method according to the fourth aspect.

According to a seventh aspect, there is provided a computer program product comprising program instructions which, when loaded into an apparatus, execute the method according to the third aspect.

According to an eight aspect, there is provided a computer program product comprising program instructions which, when loaded into an apparatus, execute the method according to the fourth aspect.

According to a ninth aspect, there is provided an apparatus, comprising means for performing the method according to the third aspect, and/or means configured to cause a user equipment to perform the method according to the third aspect.

According to a tenth aspect, there is provided an apparatus, comprising means for performing the method according to the fourth aspect, and/or means configured to cause a user equipment to perform the method according to the fourth aspect.

According to an eleventh aspect, there is provided computer system, comprising: one or more processors; at least one data storage, and one or more computer program instructions to be executed by the one or more processors in association with the at least one data storage for carrying out the method according to the third aspect and/or the method according to the fourth aspect.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
at least one processor and at least one memory including a computer program code, wherein the at least one memory and the computer program code are configured, with the at least one processor, to cause the apparatus to:
receive transmission on two different polarizations over a wireless channel from a device;
determine a plurality of coefficients associated with a precoding matrix based on channel measurements of the reception, wherein the coefficients at least partially define a combination matrix;
select a coefficient among the coefficients of the weaker polarization, the selected coefficient being a reference coefficient for the weaker polarization;
determine a first indicator and a second indicator for the reference coefficient, wherein the first indicator indicates a position of the reference coefficient in the combination matrix and the second indicator comprises an amplitude value associated with the reference coefficient;
report the first and second indicators to the device.

2. The apparatus of claim 1, wherein the at least one memory and the computer program code are configured, with the at least one processor, to cause the apparatus further to:
report a bitmap corresponding to the combination matrix to the device, the bitmap indicating spatial and frequency domain locations of those coefficients that exceed a predetermined threshold;
report the first indicator to the device in a sequence comprising amplitude values of the coefficients exceeding the predetermined threshold except the coefficient with the largest magnitude, wherein the first indicator comprises a predetermined value in the sequence,
wherein the order of the sequence is determined by the bitmap, and the position of the first indicator in the sequence determines the position of the reference coefficient in the combination matrix.

3. The apparatus of claim 2, wherein the second indicator is reported in a predetermined position in the sequence.

4. The apparatus of claim 1, wherein the at least one memory and the computer program code are configured, with the at least one processor, to cause the apparatus further to:
report the second indicator in a field, the position of which is independent of the first indicator, wherein the second indicator indicates the amplitude of the reference coefficient with respect to the amplitude of the coefficient with the largest magnitude.

5. The apparatus of claim 1, wherein the second indicator is reported in a field in uplink control information.

6. The apparatus of claim1, wherein the reference coefficient is the coefficient with the largest magnitude within coefficients of the weaker polarization.

7. The apparatus of claim 1, wherein the apparatus is a user equipment.

8. An apparatus, comprising:
at least one processor and at least one memory including a computer program code, wherein the at least one memory and the computer program code are configured, with the at least one processor, to cause the apparatus to:
transmit on two different polarizations over a wireless channel to a device;
receive a first indicator and a second indicator from the device, the first and second indicators representing a reference coefficient for the coefficients of the weaker polarization, the coefficients being associated with a precoding matrix based on channel measurements, wherein the coefficients at least partially define a combination matrix;
derive position of the reference coefficient in the combination matrix based on the first indicator.

9. The apparatus of claim 8, wherein the at least one memory and the computer program code are configured, with the at least one processor, to cause the apparatus further to:
receive a bitmap corresponding to the combination matrix from the device, the bitmap indicating spatial and frequency domain locations of those coefficients that exceed a predetermined threshold;
receive the first indicator from the device in a sequence comprising amplitude values of the coefficients exceeding the predetermined threshold except the coefficient with the largest magnitude, wherein the order of the sequence is determined by the bitmap, and wherein the first indicator comprises a predetermined value in the sequence; and
derive the position of the reference coefficient in the combination matrix further based on the bitmap.

10. The apparatus of claim 8, wherein at least one processor and at least one memory including a computer program code, wherein the at least one memory and the computer program code are configured, with the at least one processor, to cause the apparatus further to:
receive the second indicator in a field, the position of which is independent of the first indicator, wherein the second indicator indicates the amplitude of the reference coefficient with respect to the amplitude of the coefficient with the largest magnitude;
derive the magnitude of the reference coefficient based on the second indicator.

11. The apparatus of claim 8, wherein the reference coefficient is the coefficient with the largest magnitude within the coefficients of the weaker polarization.

12. A method, comprising:
receiving, at a user equipment, transmission on two different polarizations over a wireless channel from network;
determining a plurality of coefficients associated with a precoding matrix based on channel measurements of the reception, wherein the coefficients at least partially define a combination matrix;
selecting a coefficient among the coefficients of the weaker polarization, the selected coefficient being a reference coefficient for the weaker polarization;
determining a first indicator and a second indicator for the reference coefficient, wherein the first indicator indicates a position of the reference coefficient in the combination matrix and the second indicator comprises an amplitude value associated with the reference coefficient;
reporting the first and second indicators to the network.

13. The method of claim 12, further comprising:
reporting a bitmap corresponding to the combination matrix to the network, the bitmap indicating spatial and frequency domain locations of those coefficients that exceed a predetermined threshold;
reporting the first indicator to the network in a sequence comprising amplitude values of the coefficients exceeding the predetermined threshold except the coefficient with the largest magnitude, wherein the first indicator comprises a predetermined value in the sequence wherein the order of the sequence is determined by the bitmap, and the position of the first indicator in the sequence determines the position of the reference coefficient in the combination matrix.

14. The method of claim 13, wherein the second indicator is reported in a predetermined position in the sequence.

15. The method of claim 12, further comprising:

reporting the second indicator in a field, the position of which is independent of the first indicator, wherein the second indicator indicates the amplitude of the reference coefficient with respect to the amplitude of the coefficient with the largest magnitude.

16. The method of claim 12, wherein the second indicator is reported in a field in uplink control information.

17. The method of claim 12, wherein the reference coefficient is the coefficient with the largest magnitude within coefficients of the weaker polarization.

\* \* \* \* \*